United States Patent [19]

Lederman

[11] Patent Number: 4,850,463

[45] Date of Patent: Jul. 25, 1989

[54] TEMPERATURE COMPENSATING ROLLER CLUTCH CAGE

[75] Inventor: Frederick E. Lederman, Sandusky, Ohio

[73] Assignee: General Motors Corporation, Detroit, Mich.

[21] Appl. No.: 239,253

[22] Filed: Sep. 1, 1988

[51] Int. Cl.⁴ .................. F16D 41/07; F16D 15/00
[52] U.S. Cl. .................................. 192/45; 384/905
[58] Field of Search .......................... 192/45, 45.1; 188/82.84; 384/557, 905

[56] References Cited

U.S. PATENT DOCUMENTS

| | | | |
|---|---|---|---|
| 3,863,742 | 2/1975 | Elmore et al. | 192/45 |
| 4,054,192 | 10/1977 | Johnson | 192/45 |
| 4,570,762 | 2/1986 | Husmann | 188/84 |
| 4,679,676 | 7/1987 | King et al. | 192/45 |
| 4,712,661 | 12/1987 | Lederman et al. | 192/45 |

FOREIGN PATENT DOCUMENTS 2719685  9/1978  Fed. Rep. of Germany .

Primary Examiner—Rodney H. Bonck
Attorney, Agent, or Firm—Patrick M. Griffin

[57] ABSTRACT

A plastic roller clutch cage has centrally located rigid connectors joining roller pockets together at symmetrically deformable portions of the roller pockets to allow the cage to adapt itself to differentially expanding and contracting clutch races without distorting the cage.

3 Claims, 2 Drawing Sheets

TEMPERATURE COMPENSATING ROLLER CLUTCH CAGE

This invention relates to roller clutches in general, and specifically to a unitary plastic cage for a roller clutch that can compensate for the differentials in rates of thermal expansion and contraction between the plastic and the metal races.

BACKGROUND OF THE INVENTION

A problem recognized by those familiar with roller clutch design is the significantly different rates of thermal expansion and contraction of metal clutch races and the plastic roller retaining cages that are installed between the metal races. At cold temperatures, the cage will shrink down at a more rapid rate, potentially binding on the inner race. At high temperatures, the cage will expand out more, potentially binding into the outer race. Metal cages obviously do not present that problem. Still, plastic is lighter, cheaper, and provides an excellent bearing surface in the case of concentricity control cages. So, plastic is often preferred, especially if the cage can be easily molded in one piece. The problem with conventional one piece plastic cages is that when they expand or contract, so does their entire circumference, which is their largest dimension. Since the circumference is directly proportional to the radius, the cage radius expands or contracts as a proportion of the large circumference.

One solution is a plastic cage that is not one piece, but which is instead made up of a series of separate, adjacent sections that can expand and contract independently. If an independent section expands or contracts by a certain percentage, the effective increase in the radius of the cage is proportional only to the radial thickness of the cage section, which is much smaller than the circumference of an equivalent size unitary cage. A multi piece cage is therefore inherently less likely to bind into the races with extreme temperature changes. Examples of multi piece cages may be seen in U.S. Pat. Nos. 4,054,192 to Johnson, and 4,679,676, Lederman, both assigned to the assignee of the subject invention.

Given the inherent handling and manufacturing advantages of a one piece plastic cage, however, attempts have been made to create one that can conform to the annular space between the races as well as, or nearly as well as, a multi piece cage. One solution is to just cut or mold alternating axial slots into the cage to create expansion joints, as is done in German Offenlegungsschrift No. 27 19 685 Al. Such an approach would weaken a cage not originally designed to take such slots, and, if the slots invade the cage roller pockets, then they are no longer structurally complete. A different approach may be seen in Lederman U.S. Pat. No. 4,712,661, also assigned to the assignee of the current invention. There, the ends of the roller pockets are provided by adjacent cage cross bars 28, which are joined together by axially alternating connector members 42. The connector members 42 also provide one side rail of the roller pocket, but the other side rail 40 of each roller pocket is not connected to both cross bars 28. With temperature changes, therefore, the cage cross bars 28 can flex freely toward or away from one another about the one side rails 42, unhindered by the unconnected side rails 40. While this approximates the free flexing of a multi piece cage, the roller pockets are not structurally complete, and the pockets will inevitably tip or skew relative to one another as the cage flexes. The cage distortion resulting from this relative tipping of adjacent pockets may be minimized by using only an even number of pockets, but that is not always possible.

Another attempt to obtain multi piece flexibility in a single piece cage may be seen in U.S. Pat. No. 4,570,762 to Husmann. Its side rails are molded with a series of connecting elements 26 and 27 which are supposed to be elastically yieldable. It is claimed that this allows the cage to accommodate itself easily to the annular space between the races without binding. However, the elements 26 and 27 are in fact not very flexible, so the side rails do not react much differently in practice than conventional side rails. There are several reasons for the lack of flexibility of the elements 26 and 27. They are integrally molded of the same plastic as the cage side rails themselves, which must be fairly rigid and strong in order to stand up to roller end thrust and in order to keep the clutch races spaced apart. More importantly, the elements 26 and 27 are shaped like back to back horse shoes. In order for the side rails to yield, the horse shoes have to open and close. How easily they can open and close depends both on the inherent flexibility of the material from which they are made, which is quite inflexible, and on the length of the arms of the horse shoes, their "lever arm," in effect. And that length is limited to less than half the radial thickness of the cage, which is not very great. Another shortcoming of the Husmann cage is that, while it can be molded in a single piece, it cannot be by pass molded by a single pair of pull apart molds. The mold necessary to mold it in one piece requires a separate, radially movable slide for every roller pocket, which is costly and inconvenient.

SUMMARY OF THE INVENTION

The invention provides a one piece molded plastic roller cage that approaches the performance of a multi piece cage, but which has structurally complete roller pockets that remain aligned with the cage axis as the cage flexes.

In the embodiment disclosed, the cage includes an even or odd plurality of adjacent roller pockets arranged in a generally circular pattern about an axis. Each pocket has an end portion that is significantly less rigid than the rest of the roller pocket, enough so to be easily deformable. Specifically, each roller pocket is a basic rectangle, with a first cross bar at one end that is substantially narrower than, and therefore more elastic than, a parallel second cross bar at the other end of the pocket. Parallel, rigid side rails connect the cross bars, forming a structurally complete box. Rigid connector bars extend circumferentially between the centers of the first and second cross bars of adjacent roller pockets, and are disposed in a central plane perpendicular to the cage axis. In the free state, at a nominal temperature, the roller pockets are all aligned with the cage axis, with all cross bars and side rails parallel and square to one another.

In use, if the cage shrinks down or expands out more than the annular space it is located in, the narrow, deformable cross bars are buckled out or in by the rigid connector bars. Since the narrow cross bars are essentially as long as the cage is wide, they can deform fairly easily. So, no part of the cage binds into either race very strongly. Furthermore, because of the central location of the connector bars, the deformation of the narrow cross bars will be symmetrical about their centers, leaving the remainder of the roller pockets essentially unaffected. Therefore, all roller pockets remain effectively aligned with the cage axis, without skewing or tipping relative to one another.

It is, therefore, a general object of the invention to attain improved elasticity and temperature compensation capability in a one piece plastic cage.

It is another object of the invention to provide such a one piece plastic cage that has roller pockets that are structurally complete, and which remain aligned with the cage axis as the temperature changes.

It is another object of the invention to attain such improved elasticity in a unitary cage by providing each roller pocket with a deformable portion, and connecting each deformable portion to each adjacent pocket with a rigid, centrally located connecting member, so that the cage-race size divergence that occurs with changing temperature will result in a symmetrical buckling of the deformable roller pocket positions, thereby preventing the cage from binding strongly on the races while allowing the roller pockets to remain aligned with the cage axis.

DESCRIPTION OF THE PREFERRED EMBODIMENT

These and other objects and features of the invention will appear from the following written description, and from drawings, in which.

Figure 2:
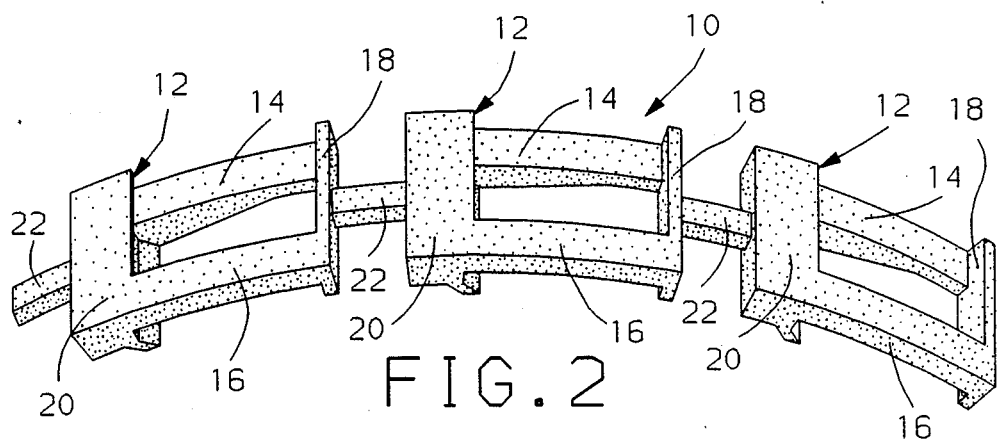
FIG. 2 is a perspective view of a portion of the cage alone, in its free molded state.

Referring first to FIG. 2, a preferred embodiment of the cage of the invention is indicated generally at 10. Cage 10 is molded in one piece of nylon or other suitable material, and is shown in its free molded state, at a nominal temperature. Cage 10 is generally annular in shape, with a series of circumferentially spaced rectangular roller pockets, indicated generally at 12, arranged in a circle about the cage axis. Each roller pocket 12 has a pair of parallel, axially spaced side rails, 14 and 16, and first and second parallel, circumferentially spaced cross bars, 18 and 20 respectively. Given their orientation to the cage axis, the side rails 14 and 16 have a circumferential length, axial width, and radial thickness, while the cross bars 18 and 20 have an axial length, circumferential width, and radial thickness. The side rails 14 and 16 could be made identical, but instead are arranged in an "over-under" pattern that allows them to be by pass molded. Given the fact that their length is disposed circumferentially, the side rails 14 and 16 will be inherently rigid in the circumferential direction, just as even a thin rod is rigid when pulled end to end. Furthermore, considering their width, the side rails 14 and 16 will be relatively rigid in the axial direction, and will resist forces attempting to push them axially inwardly toward each other, especially at locations closer to the cross bar 20.

Figure 3:
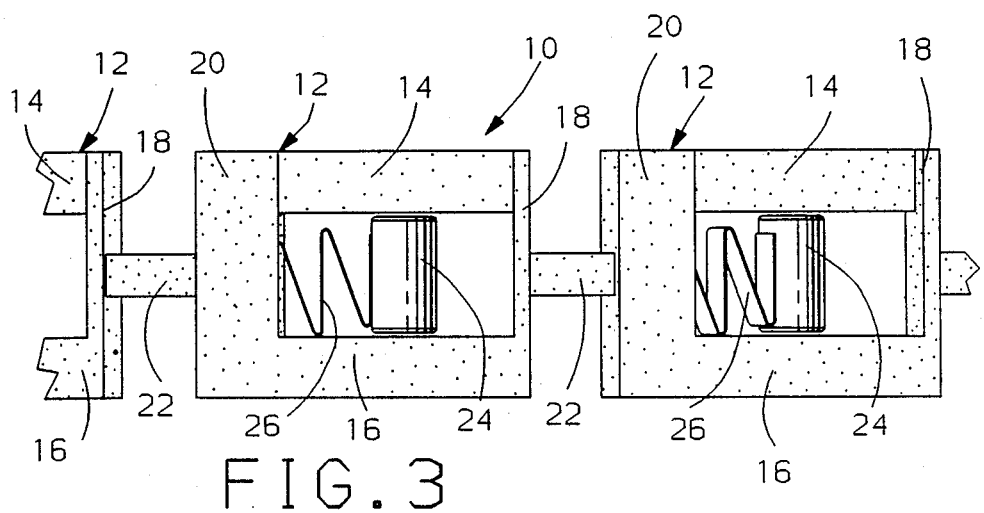
FIG. 3 is a plan view of two roller pockets of the cage at the same temperature as FIG. 1.

Referring next to FIG. 3, it may be seen that each cross bar 18 is significantly narrower than each cross bar 20. Given its greater width, each cross bar 20 will strongly resist circumferentially directed forces attempting to buckle it in or out. Each narrow cross bar 18, however, will be much more subject to deformation, especially by a circumferentially directed force acting at is center, like a thin board held between its ends and supporting a weight at its center. Each narrow cross bar 18 of each pocket 12 is spaced from and parallel to a respective wider cross bar 20 of an adjacent roller pocket 12, and vice versa. The adjacent cross bars 18 and 20 of adjacent pockets 12 are connected together connector bars 22 running perpendicularly between their centers. The connector bars 22 are also rigid in the circumferential direction, and are disposed in a central plane of the cage 10 that is perpendicular to the cage axis. Finally, a cylindrical roller 24 and spring 26 are added to each pocket 12. Although not illustrated, spring 26 could, if desired, load each roller 24 against a respective narrow cross bar 18 for shipping retention prior to installation. The narrow cross bars 18 are undeformed prior to installation, and more than strong enough to provide roller rest surfaces during shipping.

Figure 1:
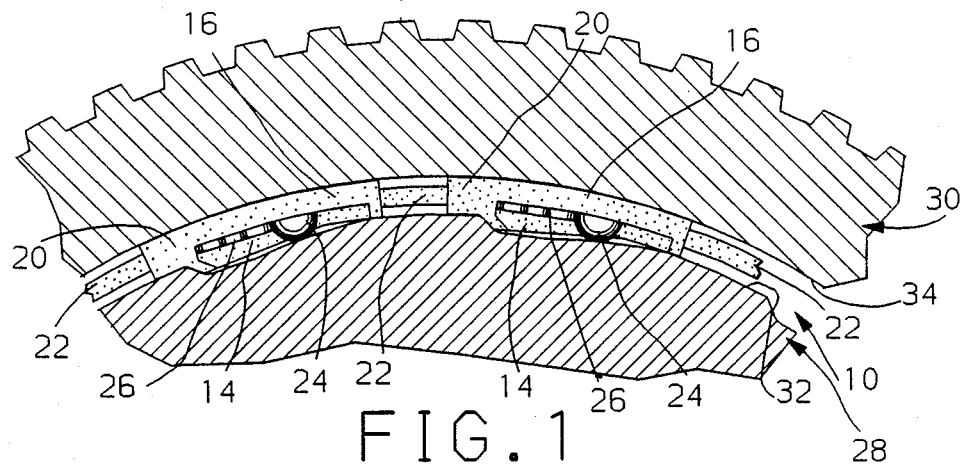
FIG. 1 is an end view of a portion of the clutch and cage of the invention installed between a pair of races at a nominal temperature.

Referring next to FIG. 1, an inner cam race 28 and an outer pathway race 30 have confronting inner surfaces 32 and 34 respectively, which form an annular space in which cage 10 is installed. Cage 10 is installed by the usual "ringing in" method, in which it is first installed to cam race 28. The inner surfaces of the cross bars 20 and lower side rails 14 are shaped to fit closely to the cam race surface 32, so that cage 10 will not turn relative to the cam race 28. Then, the outer pathway race 30 is pushed in over the rollers 24, and twisted counterclockwise, which shifts them away from the narrow cross bars 18. The cross bars 20 are thick enough that their outer surfaces ride on the cylindrical pathway race surface 32 during clutch overrun, when the outer race 30 would be rotating counterclockwise relative to the inner race 28. The cross bars 20 are also axially wide enough to act as support bearings to keep the races 28 and 30 coaxial to one another, and also act as foundations for the springs 26. The side rails 14 and 16 take end thrust and keep the rollers 24 axially confined. In a conventional cage, after installation, the cross bars corresponding to the narrow cross bars 18 would serve no particular purpose except insofar as they helped to keep the side rails 14 and 16 rigidly axially spaced. After installation, the narrower cross bars 18 no longer touch the rollers 24, and the wider cross bars 20 and side rails 14 and 16 are maintained in the proper location entirely by the cam race 28. The invention, however, finds another use for the cross bars 18 after installation, as will be next described.

Figure 4:
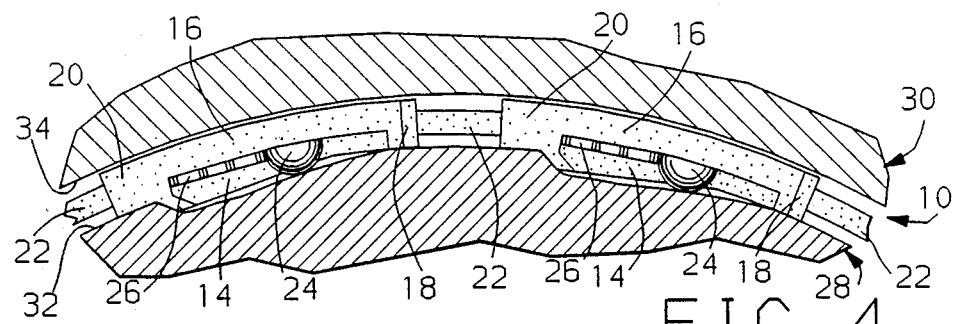
FIG. 4 is an end view of a portion of the clutch and cage of the invention installed between a pair of races at a siginificantly colder temperature.
Figure 7:
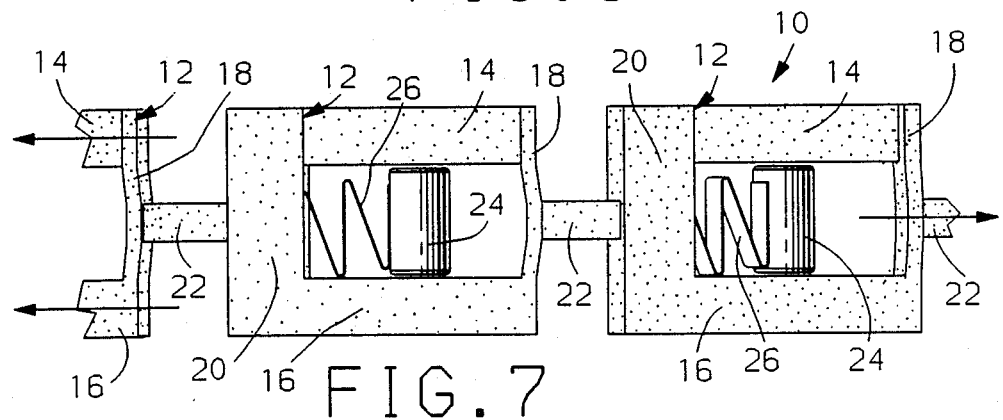
FIG. 7 is a plan view of two roller pockets of the cage at the same temperature as FIG. 4.

Referring next to FIGS. 4 and 7, the effect of a significant temperature drop is illustrated. Because of the smaller rate of thermal expansion and contraction of the races 28 and 30 compared to the cage 10, cage 10 will tend to shrink more than the inner race 28, diverging inwardly from the annular space in which it is located. As cage 10 shrinks around inner race surface 32, it is put into tension. The tension force causes the connector bars 22 to pull out on the narrow cross bars 18. Since the narrow cross bars 18 are the weakest link, the stress will be concentrated there, and they will buckle or bow outwardly, allowing the distance between the adjacent roller pockets 12 to increase. The more rigid connector bars 22 and side rails 14 and 16 will be substantially unaffected. So, the circumference of cage 10 is allowed to grow, in effect, preventing the tight binding on inner race surface 32 that would otherwise occur.

Figure 5:
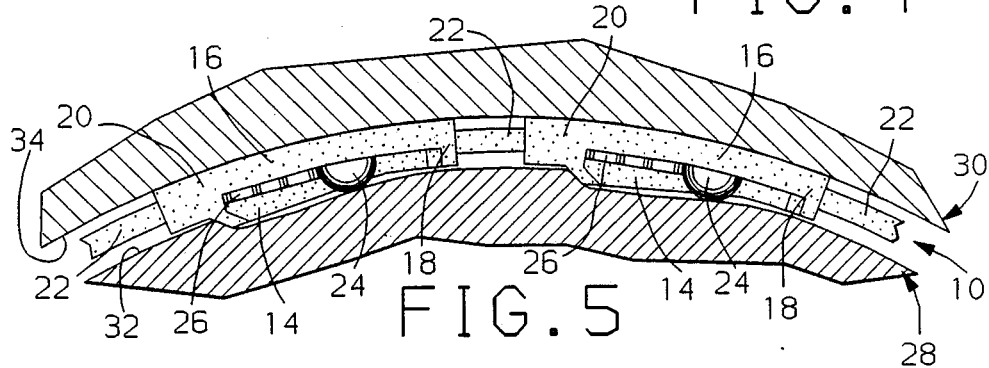
FIG. 5 is an end view of a portion of the clutch and cage of the invention installed between a pair of races at a significantly warmer temperature.
Figure 6:
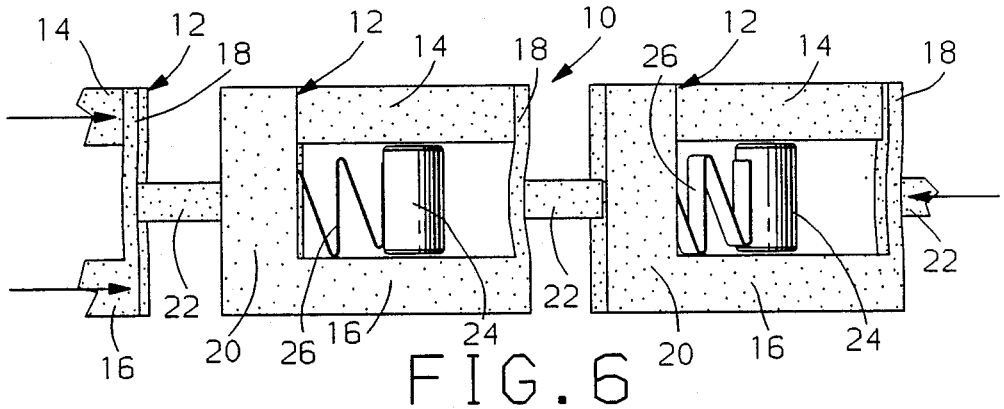
FIG. 6 is a plan view of two roller pockets of the cage at the same temperature as FIG. 5.

Referring next to FIGS. 5 and 6, the converse situation is shown. With a large temperature increase, the cage 10 tends to expand more than the outer race 30, diverging outwardly from the annular space in which it is located. This puts cage 10 into compression against outer race surface 34. The narrow cross bars 18 will now buckle inwardly, allowing cage 10 to effectively contract and avoid binding the outer surfaces of the cross bars 20 tightly into the outer race surface 34. So, in general, the cage 10 accommodates itself to the annular space between the races 28 and 30 with a temperature change in either direction. While some of the known cages described above also provide temperature change compensation, here the roller pockets 12 do not skew or tip relative to one another. Because of the fact that the connector bars 22 are all located in a central plane, the deformation of the narrow cross bars 18 occurs symmetrically about their centers. So, as the roller pockets 12 move together or apart, they stay basically parallel to and aligned with one another, and aligned with the cage axis. More specifically, since the narrow cross bars 18 buckle symmetrically about their centers, they stay basically parallel to the wide cross bars 20. And while the side rails 14 and 16 may be pulled slightly closer together by the buckling of the narrow cross bars 18, the pockets 12 will not tip relative to one another, because the cross bars 18 and 20 will still remain basically parallel to one another. There is thus no need to provide an even number only of pockets 12 to compensate for pocket skewing and even out the cage distortion.

Essentially all the elements of the cage 10 cooperate. The relatively greater widths of the side rails 14 and 16 and the cross bars 20 aids them in their functions of retaining the rollers 24 and supporting the races 18 and 20, while at the same time emphasizing the relatively greater elasticity of the narrower cross bars 18. This relative sizing assures that deformation will result where it is wanted in the pocket 12, and not elsewhere. The connector bars 22 hold the roller pockets 12 together before installation, and also transfer cage tension and compression to the narrow cross bars 18 after installation. Another feature that is very advantageous is that the outer surfaces of all the cage elements have no undercuts relative to the cage axis, and so can all be molded by a single pair of axially parting molds. Still, variations of the preferred embodiment may be made. Most broadly, so long as some relatively more deformable portion of each roller pocket is acted on by a rigid connector member as the cage tends to expand or contract, and so long as the connector members are also centrally located in a plane normal the the axis of the cage, the pockets will remain basically aligned with the cage axis as the cage shrinks or grows. The weaker, deformable portion of the pockets should also be associated with some part of the pocket which will not interfere with the basic functions of the cage after installation, as in the preferred embodiment. Many cage configurations that meet those basic criteria may be developed. Therefore, it will be understood that it is not intended to limit the invention to just the preferred embodiment disclosed.

The embodiments of the invention in which an exclusive property or privilege is claimed are defined as follows:

1. A unitary cage for a one way clutch that is adapted to be installed in the annular space between a pair of relatively rotatable clutch races, and which retains a complement of spring energized rollers in said annular space, and in which the material of said cage and said races have differing coefficients of thermal expansion and contraction, so that said annular space and said cage tend to diverge with changing temperature, said unitary cage comprising, a plurality of adjacent roller pockets arranged in a generally circular pattern about an axis, each pocket having a portion that is sufficiently less rigid than the rest of said roller pocket so as to be deformable, and, a plurality of substantially rigid connecting members interconnecting each of said roller pockets at said pocket deformable portions so as to form a unitary cage, said connecting members further being disposed generally about a central plane perpendicular to said axis, whereby, as said cage and annular space tend to diverge in size with changing temperature, said roller pockets can move relative to one another as said pocket end portions are symmetrically deformed by said connecting members, thereby preventing said cage from binding strongly on either race, while at the same time said roller pockets will remain effectively aligned with said axis.

2. A unitary cage for a one way clutch that is adapted to be installed in the annular space between a pair of relatively rotatable clutch races, and which retains a complement of spring energized rollers in said annular space, and in which the material of said cage and said races have differing coefficients of thermal expansion and contraction, so that said annular space and said cage tend to diverge with changing temperature, said unitary cage comprising, a plurality of adjacent, substantially rectangular roller pockets arranged in a generally circular pattern about an axis, each pocket comprising a pair of generally parallel side rails, a first cross bar, and a second cross bar generally parallel to said first cross bar, said first and second cross bars of adjacent roller pockets further being located adjacent to one another and generally parallel to said axis in their free state, so that said pockets are aligned with said axis, each of said first cross bars also being substantially freely deformable, while each of said second cross bars is substantially rigid, and, a plurality of substantially rigid connecting members, each substantially perpendicular to and extending from the center of a respective first cross bar to the center of the adjacent second cross bar of the adjacent roller pocket, thereby connecting all roller pockets together as a unitary cage, whereby, as said cage and annular space tend to diverge in size with changing temperature, said roller pockets can move relative to one another as said first cross bars are deformed symmetrically about their centers by said connecting members, thereby preventing said cage from binding strongly on either race, while at the same time said second cross bars, side rails, and connecting members will remain substantially unaffected and said roller pockets will remain effectively aligned with said axis.

3. A unitary cage for a one way clutch that is adapted to be installed in the annular space between a pair of relatively rotatable clutch races, and which retains a complement of spring energized rollers in said annular space, and in which the material of said cage and said races have differing coefficients of thermal expansion and contraction, so that said annular space and said cage tend to diverge with changing temperature, said unitary cage comprising, a plurality of adjacent, substantially rectangular roller pockets arranged in a generally circular pattern about an axis, each pocket comprising a pair of generally parallel side rails, a first cross bar, and a second cross bar generally parallel to said first cross bar, said second cross bars further being sufficiently wide and sufficiently thick relative to said annular space to support said races substantially coaxial to one another after said cage is installed, while said first cross bars are substantially narrower, said first and second cross bars of adjacent roller pockets further being located adjacent to one another and generally parallel to said axis in their free state, so that said pockets are aligned with said axis, and, a plurality of substantially rigid connecting members, each substantially perpendicular to and extending from the center of a respective first cross bar to the center of the adjacent second cross bar of the adjacent roller pocket, thereby connecting all roller pockets together as a unitary cage, whereby, as said cage and annular space tend to diverge in size with changing temperature, the force with which said cage would otherwise bind into either of said races will be concentrated at said first cross bars, which will be deformed symmetrically about their centers by said connecting members, thereby preventing said cage from binding strongly on either race, while at the same time said second cross bars, side rails, and connecting members will remain substantially unaffected and said roller pockets will remain effectively aligned with said axis.

* * * * *